(No Model.)

J. B. HOUSTON.
METALLIC ROD PACKING.

No. 463,053. Patented Nov. 10, 1891.

Witnesses:
E. A. Brandau
W. D. Bentz

Inventor:
John B. Houston
By his Atty.
John Richards

UNITED STATES PATENT OFFICE.

JOHN B. HOUSTON, OF SAN FRANCISCO, CALIFORNIA.

METALLIC ROD-PACKING.

SPECIFICATION forming part of Letters Patent No. 463,053, dated November 10, 1891.

Application filed June 13, 1891. Serial No. 396,142. (No model.)

*To all whom it may concern:*

Be it known that I, JOHN B. HOUSTON, a citizen of the United States, residing in the city and county of San Francisco, State of California, have invented certain new and useful Improvements in Metallic Packing for Piston-Rods; and I hereby declare the following specification and accompanying drawings to form a true and exact description of my invention.

This invention relates to elastic or adjustable metallic packing for piston-rods capable of compensating for wear and also, when required, permitting lateral adjustment, commonly called "floating," so that deviations of the rod from true alignment will not permit the escape of steam or other fluid.

My invention consists in employing two sets of double packing-rings embracing the piston rod at both the outer and inner ends of the stuffing-box, behind or surrounding these rings thin bands or collars capable of flexure, and outside of these bands sections of a beveled or wedge ring operated by screws, and still beyond and embracing these wedge-sections a complete ring with corresponding beveled faces, on which falls the strain of compression independent of the main shell or stuffing-box containing the packing.

My invention also includes two flat rings for compressing and adjusting the sections of the wedge-ring before named, these flat rings being operated by screws, which press uniformly and dependently upon them, producing like compression of the packing at each end of the stuffing-box. Such screws being multiple and connected together by means of tooth-gearing, the adjustment will be uniform and equal, not only in respect to the compression of the packing at both ends, but also in respect to all sides of the piston-rod.

My invention also consists in the employment of a collar or distance-piece between the two sets of packing-rings at the outer and inner ends of the stuffing-box, in which collar or distance-piece the flat rings before named are embedded and the ends of which have a ground fit against the packing, so as to permit when required lateral adjustment of the packing as a whole without any leak of steam or the fluid.

The object of my invention is to provide a sensitive adjustment of the bearing-surfaces, applied, preferably, at two points on the rod, and all adjustments to and from the rod or in the line of wear balanced and equal as between the two packings, thus insuring a tight joint with a minimum of friction.

Figure 1:
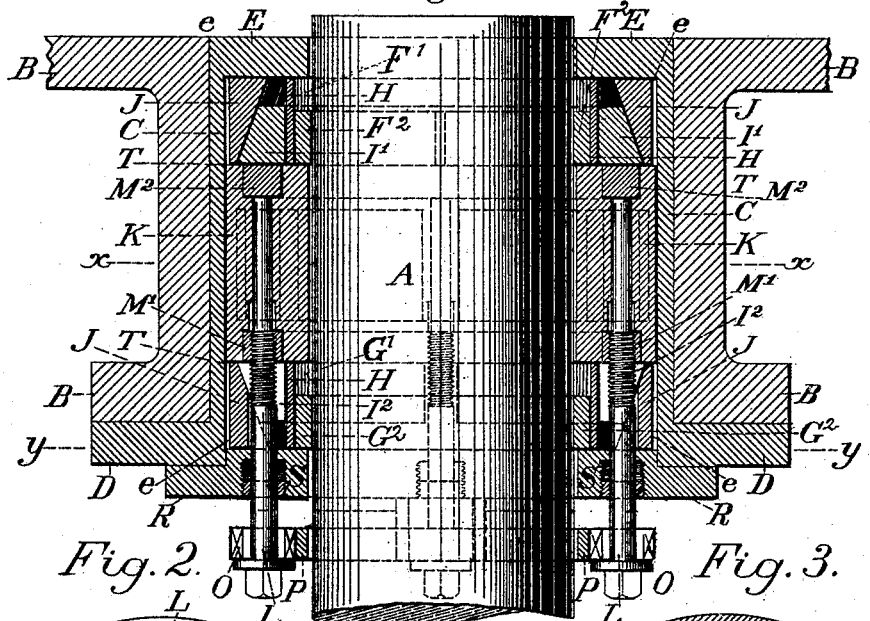
Figures 2, 3:
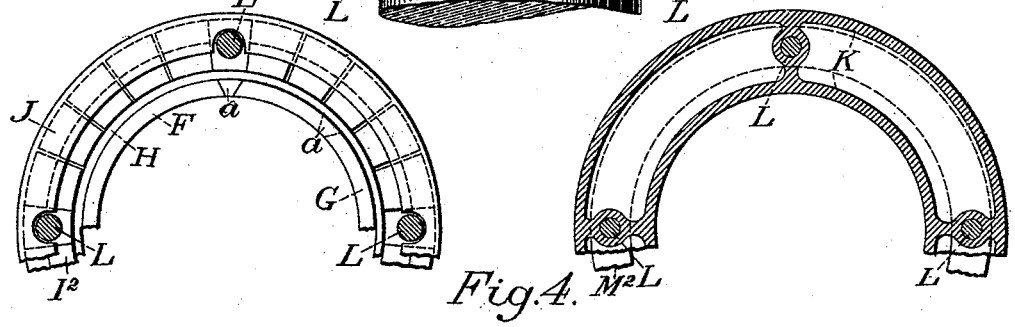
Figure 4:
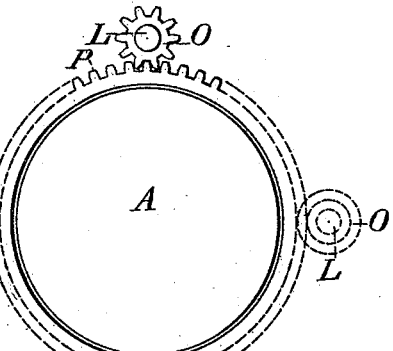

Referring to the drawings, Figure 1 is a section through my improved piston-rod packing, taken centrally on the axis of the rod. Fig. 2 is a partial top view on the line $y\ y$ of Fig. 1. Fig. 3 is a partial section through Fig. 1 on the line $x\ x$, and Fig. 4 is a detail showing the manner of connecting the adjusting-screws for regulating the pressure of the packing on the rod.

Similar letters of reference indicate corresponding parts in the different figures of the drawings, which will now be explained.

A represents a section of the piston-rod, and B a section of the head and packing-nozzle of a steam-engine cylinder.

C is a shell or case containing the packing and is bolted to the nozzle B by the flanges D. This shell C has an internal flange E, forming the bottom of the stuffing box or chamber, so that by loosening the flange D the whole can be drawn back on the rod A clear of the nozzle B and of the steam-cylinder.

Around the piston-rod A are placed at each end of the stuffing-box pairs of split packing-rings F' and F² at the inner end and G' and G² at the outer end, the joints of which are indicated at $a$ and $a$, Fig. 2. Around these rings F' F² G' G² are placed thin flexible rings or bands H, also split at one or more places to permit annular adjustment, and outside of these rings or bands H is a series of wedge-shaped segments I' and I². (Shown in section at the top and by full view at the bottom in Fig. 1, and also indicated in plan by dotted lines in Fig. 2.) These wedge-shaped segments are formed by preparing a continuous ring corresponding to the section at I', Fig. 1, which ring is then cut into pieces, their number corresponding to the rigidity of the inner rings, the size of the rod, or other conditions of use. These segmental wedges I' I² bear upon outer beveled rings J, which are continuous and in most cases are made smaller in their extreme diameter than the bore of the shell C, so as to leave some space at $e\ e$, as shown in Fig. 1, the purpose of which will be hereinafter explained.

The object of employing these short segments I' and I² is to secure a bearing at a number of points against the outer ring J, because there could not otherwise be any proper adjustment on the oblique surfaces between the segments and the outer ring J.

Between the two sets of packing-rings heretofore described, and which are the same at each end of the stuffing-box, is interposed a distance piece or collar K, having a section, as shown in Fig. 3, provided with holes, through which pass the screws L. The section of this collar K may be of any symmetrical form or solid. I construct it as shown to avoid weight and save material. In the ends of the collar K are loosely embedded two rings M' and M², which bear upon and press these rings outward or apart in the following manner: The screws L have a nut or screw-thread in the outer ring M', as shown in Fig. 1, and then extend to and bear upon the other or inner ring M², so that by turning these screws the two rings M' and M² are forced apart with equal force, causing compression of the inner rings, that bear on the piston-rod A, by reason of the beveled surfaces on the outer ring J. The screws L have formed upon their outer ends tooth-pinions O, meshing into an annular gear-wheel P, as shown in Figs. 1 and 4, so that by turning either screw they all move equally, producing a uniform adjustment of the packing on all sides of the rod A.

The screws L may be two or more in number, as the diameter and character of the parts may demand. Four are shown in the drawings, so that the pressure on the rings M' and M² will not distort them when the proportions are as illustrated.

Covering and retaining the packing in the shell G is a plate R, and in this plate are short packing-glands S where the bolts L pass through, so that when the latter are loosened all the internal parts contained in the shell C can when required be withdrawn and replaced.

It will be observed in the drawings that some space is left where the piston-rod A passes through flange E, the plate R, and the distance piece or collar K, the only parts bearing upon the rod A being the packing-rings F', F², G', and G². This permits the packing to move laterally, sliding at the joints T, and permitting lateral deviation of the piston-rod A in case it runs out of truth, forming what is technically known as "floating packing." It will be understood that in cases where no deviation of the piston-rod A can take place, as in the case of tail-rods, the outer rings J may fit closely in the removable shell C or be an integral part therewith without in any way interfering with the nature of my invention.

Having thus described the nature and objects of my invention, also the manner of constructing and applying the same, what I claim as new, and desire to secure by Letters Patent, is—

1. In a piston-rod packing, the double sets of packing-rings consisting of the various members herein described, similarly arranged at the outer and inner end of a stuffing-box, with adjusting-screws L acting equally on the segmental wedge-pieces J and on each set of rings, producing like compression of the packing at two points on the rod A, substantially in the manner and for the purposes set forth.

2. In a piston-rod packing, the segmental wedge-pieces I' and I² and outer rings J, in combination with the adjusting-screws L, producing equal compression on the inner packing-rings independent of the shell or chamber C, thereby permitting when required lateral movement of the rod A and its packing, so as to prevent leaking of steam or other fluid around the rod when the latter deviates from a true rectilinear movement, substantially as herein specified, and for the purposes set forth.

3. In a piston-rod packing, the inner packing-rings F', F², G', and G², the split ring or band H, segmental wedges with the bearing-rings M' and M² pressing thereon, and an outer ring J, binding and sustaining the packing independent of its outer casing C, substantially in the manner herein specified, and for the purposes set forth.

4. In a piston-rod packing, the two pressing-rings M' and M², with screws L to force the rings in opposite directions and balance the compressing strain on two sets of packing-rings separated by a distance-collar K, through which the adjusting-screws pass, substantially as shown in the drawings herein described.

5. In a piston-rod packing, the multiple screws L, two or more in number, connected with and operating the pressing-rings M' and M², in conjunction with beveled surfaces and inside packing-rings, and moving uniformly by means of pinions O and a gear-wheel R, substantially in the manner and for the purposes herein specified.

6. In a piston-packing, two sets of packing-rings, as herein described, acting independently, except as to their adjustment, and separated by a distance-collar K, having pressing-rings M' and M² embedded in its faces and adjusting-screws L passing through it, the whole constructed and operating substantially as set forth.

In testimony whereof I have hereunto affixed my signature in the presence of two witnesses.

JOHN B. HOUSTON.

Witnesses:
ARFRED A. ENQUIST,
W. A. ALLEN.